US012510448B2

(12) United States Patent
Gilli et al.

(10) Patent No.: US 12,510,448 B2
(45) Date of Patent: Dec. 30, 2025

(54) DEVICE FOR TESTING AT LEAST ONE BATTERY CELL

(71) Applicant: AVL LIST GMBH, Graz (AT)

(72) Inventors: Augustin Gilli, Graz (AT); Markus Peer, Graz (AT); Martin Schwab, Graz (AT)

(73) Assignee: AVL LIST GMBH, Graz (AT)

( * ) Notice: Subject to any disclaimer, the term of this patent is extended or adjusted under 35 U.S.C. 154(b) by 190 days.

(21) Appl. No.: 18/029,534

(22) PCT Filed: Sep. 30, 2021

(86) PCT No.: PCT/AT2021/060352
§ 371 (c)(1),
(2) Date: Mar. 30, 2023

(87) PCT Pub. No.: WO2022/067366
PCT Pub. Date: Apr. 7, 2022

(65) Prior Publication Data
US 2023/0393044 A1 Dec. 7, 2023

(30) Foreign Application Priority Data
Oct. 1, 2020 (AT) .............................. A 50841/2020

(51) Int. Cl.
*G01N 3/08* (2006.01)
*G01N 3/06* (2006.01)
*H01M 10/42* (2006.01)

(52) U.S. Cl.
CPC ............... *G01N 3/08* (2013.01); *G01N 3/066* (2013.01); *H01M 10/4285* (2013.01)

(58) Field of Classification Search
CPC ...... G01N 3/08; G01N 3/066; H01M 10/4285
See application file for complete search history.

(56) References Cited

U.S. PATENT DOCUMENTS

| 2013/0323554 A1 | 12/2013 | Heubner et al. |
| 2014/0107949 A1 | 4/2014 | Arnold et al. |
| 2014/0311223 A1 | 10/2014 | Baba et al. |

(Continued)

FOREIGN PATENT DOCUMENTS

| DE | 102018123626 A1 | 7/2019 |
| EP | 3621128 A1 | 3/2020 |
| WO | 2017087807 A1 | 5/2017 |

*Primary Examiner* — Eric S. McCall
(74) *Attorney, Agent, or Firm* — Dykema Gossett PLLC (57) ABSTRACT

The invention relates to a device (1) for testing at least one battery cell (2), more particularly of a secondary battery, the device comprising: —a first plate (3) and a second plate (4), the battery cell (2) being clamped between the two plates (3, 4), which are preferably substantially rectangular, and at least one plate (4) being pressed against the battery cell (2) with a defined mechanical pressing force (F); and—at least one force-measuring element (13) disposed between one plate (3, 4) and at least one pressing device (9), for measuring a reaction force (R) between the battery cell (2) and the pressing device (9). According to the invention, in order to increase the accuracy and the informative value of tests of battery cells (2), at least one change in a thickness (D) of the battery cell (2) can be measured, preferably simultaneously with the reaction force (R), by means of at least one displacement-measuring element (15).

24 Claims, 5 Drawing Sheets

(56) References Cited

U.S. PATENT DOCUMENTS

| | | |
|---|---|---|
| 2015/0188198 A1 | 7/2015 | Bonhomme et al. |
| 2019/0097278 A1* | 3/2019 | Park .......................... G01B 7/16 |
| 2020/0132577 A1 | 4/2020 | Kwon et al. |
| 2023/0006273 A1* | 1/2023 | Kim ..................... H01M 10/482 |
| 2023/0045364 A1* | 2/2023 | Lee ....................... H01M 10/48 |

* cited by examiner

DEVICE FOR TESTING AT LEAST ONE BATTERY CELL

CROSS-REFERENCE TO RELATED APPLICATION

This application is a national stage filing based upon International application No. PCT/AT2021/060352, filed 30 Sep. 2021, which claims the benefit of priority to Austria application No. A 50841/2020, filed 1 Oct. 2020.

BRIEF SUMMARY

Field of the Invention

The invention relates to a device for testing at least one battery cell, in particular a secondary battery, having a first plate and a second plate, wherein the battery cell is clamped between the two substantially rectangular plates and at least one plate is pressed against the battery cell with a defined mechanical pressing force, having at least one force-measuring element arranged between a plate and a pressing device for measuring a reaction force between the battery cell and the pressing device. Furthermore, the invention relates to a method for testing at least one battery cell, in particular a secondary battery, with this device.

"Substantially rectangular" means here that the plates each have the shape of a rectangle in plan with two pairs of parallel edges, although the corners of the rectangle may also be rounded.

BACKGROUND

Characterization of battery cells in terms of their chemical and physical properties is a necessary development step for the design of a battery pack.

The energy storage capacity of a battery cell depends heavily on the cell chemistry used. In addition to the cell chemistry, external influences such as the installation situation in the battery network also have an effect on the performance of a battery cell. For example, battery cells can be connected in a "floating" manner (elastic plastic components are positioned between the battery cells) or "rigid" manner (cell to cell) to form a battery pack.

Battery cells have the property that their external dimensions, in particular their thickness, change during electrical charging or discharging. This effect is also known as the so-called "breathing" and/or "swelling" effect. "Breathing" refers to a cyclical reversible increase and decrease in volume during charging and discharging processes of the battery. "Swelling" refers to an irreversible increase in volume due to aging, for example. There is also a relationship between the cell surface pressure and the storage capacity of the cell.

Testing of battery cells of different types (pouch cells, prismatic cells) is usually performed between two fixed braced metal plates.

For example, a pouch cell is clamped between two metal plates in the area of the cell body and then tightened to a desired surface pressure by means of a screw connection and a calculated torque. The cell outgoing conductors remain freely accessible for contacting the current.

Only the stiffness of the clamping plates and the torque can be adjusted in this test setup.

DE 2018 123 626 A1 discloses a battery temperature control device having a first plate for placing a battery cell and a second plate for pressing the battery cell onto the first plate. A heating device/cooling device is provided for the temperature control of the battery cell. By means of a clamping device, the second plate can be pressed against the first plate with a defined pressing force, wherein a load cell is arranged between the clamping device and the first plate.

Furthermore, devices for measuring the cell expansion of a battery cell are known, for example from documents EP 3 377 363 A1, US 2015/188198 A1, US 2014/311223 A1, US 2014/107949 A1 or US 2013/323554 A1.

The devices known from the prior art all have the characteristic that surface pressure and expansion of the battery cell cannot be measured simultaneously.

SUMMARY OF THE INVENTION

It is the object of the invention to increase the accuracy and informative value of battery cell tests.

According to the invention, the solution to the set object is solved in a device of the type mentioned above in that the change in the thickness of the battery cell can be measured by means of at least one displacement-measuring element, preferably simultaneously with the reaction force.

Thus, the reaction force and the change in thickness of the battery cell can be measured simultaneously.

The reaction force is not completely imposed by the pressing device as a pretension, but is composed of the initially imposed pressing force and the operating force of the battery cell resulting from the test, which is formed by chemical processes inside the cell body.

The force-measuring element and the displacement-measuring element are preferably formed by separate and/or spatially separated components, whereby force and displacement measurements can be carried out completely independently of each other. For example, the force-measuring element and the displacement-measuring element can be arranged at different locations of the device. Mutual interference of the measurement results is thus largely avoided.

Simple and accurate displacement measurement is possible if at least one displacement-measuring element is arranged in the region of a longitudinal center plane and/or a longitudinal transverse plane of the cell and/or at least one plate. The longitudinal center plane and the longitudinal transverse plane, which extend parallel to the direction of the contact pressure or reaction force, preferably run through the center of gravity of the cell and/or through the center of gravity of the surface of the first and/or second plate.

Accurate displacement measurement with a single displacement-measuring element is possible if the displacement-measuring element is arranged in the area of an intersection line between the longitudinal center plane and the transverse center plane.

In one embodiment variant of the invention, it is provided that the first plate and the second plate are connected to each other by at least one pressing device, wherein preferably the pressing device is arranged in the region of a corner of the first and second plates.

Preferably, in the region of at least two corners of at least one plate, in particular at each corner of at least one plate, a respective force-measuring element is arranged between the plate and a pressing device.

One embodiment variant according to the invention provides that at least one force-measuring element is designed as a force-measuring ring, with the force-measuring ring preferably being penetrated by a bolt- or sleeve-shaped section of the pressing device.

Simple and accurate force measurement can be achieved if at least one force-measuring element is designed as a strain gauge sensor. Strain gauge sensors (SG) are force-measuring devices which are based on the change in electrical resistance caused by stretching or compressing deformations.

The displacement-measuring element is preferably designed as an inductive displacement sensor.

To enable accurate detection of the cell body temperature of the battery cell, it is advantageous if at least one plate, preferably the first plate, has at least one thermal measuring element which advantageously contacts the cell body. In this way, simple and accurate monitoring of the surface temperature of the cell body can be carried out.

In a further embodiment of the invention, it is provided that at least one plate, preferably the second plate, has at least one contact element which establishes an electrical connection between at least one cell pole and a preferably flexible power cable. By integrating the contact elements forming electrical arresters into the second plate, an electrical connection of the power cable to the cell poles is established simultaneously with the compression of the battery cell when the second plate is placed on the battery cell. This enables rapid changing and renewed electrical contacting of the battery cells.

It is particularly advantageous if a temperature sensor is integrated in at least one contact element. This allows the temperature of the cell poles to be measured continuously during charging and discharging processes.

It is particularly advantageous if an electrical voltage sensor is integrated in at least one contact element. This allows the electrical voltage of the cell poles to be measured continuously during charging and discharging processes.

In the context of the invention, it may further be provided that a cell compression pad is arranged between at least one plate and the battery cell.

With the device according to the invention, it is possible to test battery cells with regard to their electrochemical and physical properties (such as stiffness).

With the device, the battery cell is clamped between a first plate and a second plate and at least one plate is pressed against the battery cell with a defined mechanical pressing force, wherein a reaction force between the battery cell and at least one plate is measured. The object is solved in that—preferably simultaneously with the reaction force—at least one change in the thickness of the battery cell is also measured.

In one embodiment according to the invention, it is provided in this case that at least two reaction forces are measured at different locations of the battery cell.

In a further embodiment of the invention, it is provided that the change in thickness is measured at a different location in the battery cell than the reaction force.

This makes it possible to create an exact cell expansion profile of the battery cell.

A further increase in the accuracy of the validity of the investigation can be achieved if, based on the measurement results, a model calculation is carried out with a virtual calculation model of the device, preferably by means of inverse parameter identification, wherein disturbance and influencing variables of the device are filtered out.

BRIEF DESCRIPTION OF THE DRAWINGS

The invention is explained in more detail below with reference to the non-limiting exemplary embodiment shown in the figures, wherein.

DETAILED DESCRIPTION

The device 1 shown in FIGS. 1 to 11 for testing a battery cell 2 of a secondary battery has a first plate 3 and a second plate 4. The battery cell 2 may be, for example, a pouch cell or a prismatic cell.

The first plate 3 forms a lower base platform into which the battery cell 2 is inserted. Depending on the cell size, the base platform can be of different sizes.

The second plate 4 forms a pressure body which is connected to the lower base platform via pressing devices 9. The battery cell 2 is braced between the pressure body and the base platform.

The battery cell 2 to be tested, which has a cell body 20 and cell poles 2a, 2b, is thus held and clamped between the two essentially rectangular plates 3, 4. In the exemplary embodiment, the plates 3, 4 are formed substantially symmetrically with respect to a longitudinal center plane 5 and a transverse center plane 6 arranged normal thereto, wherein the longitudinal center plane 5 and the transverse center plane 6 pass through the centroid 7 of the sides of the plates 3, 4 having the largest areas. The intersection line of the longitudinal center plane 5 and the transverse center plane 6 passing through the centroid 7 is designated by reference sign 8.

At least one plate 3, 4 is pressed against the battery cell 2 with at least one defined mechanical pressing force F, wherein the two plates 3, 4 are held under pretension by the pressing devices 9. The pressing forces F extend parallel to the vertical axis z drawn in FIG. 1, i.e. parallel to the longitudinal center plane 5 and to the transverse center plane 6, and parallel to the intersection lines 8 of the longitudinal center plane 5 and transverse center plane 6.

The pressing devices 9 are formed by screw connections 10 arranged symmetrically with respect to the longitudinal plane 5 and the transverse plane 6, wherein bolt- or sleeve-shaped sections 11 of the screw connections 10 are guided through openings 12 in the plates 3, 4 and pass through them. In this context, an opening 12 is arranged at each corner 3a, 3b, 3c, 3d; 4a, 4b, 4c, 4d of the plates 3, 4 for accommodating a respective screw connection 10. The corners 3a, 3b, 3c, 3d; 4a, 4b, 4c, 4d of the plates 3, 4 may be rounded, as can be clearly seen, for example, from FIGS. 1 to 3.

The pressing force F is applied to the cell body 20 by means of the screw connection 10 between the base platform—the first plate 3—and the pressure body—the second plate 4—via bolt- or sleeve-shaped sections 11 which are designed, for example, as stud bolts. In this connection, one force-measuring element 13 is provided for each screw connection 10 in order to measure the reaction force R. The reaction force R is composed of the pressing force F initially applied as pretension by the pressing device 9 and the operating force of the battery cell resulting from temperature and state of charge and charge/discharge processes under the test conditions. The operating force is essentially due to chemical processes inside the cell body.

Figure 9:
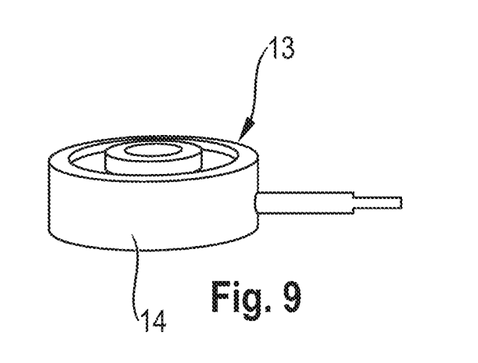
FIG. 9 shows a force-measuring element of the device in an axonometric representation.
Figure 10:
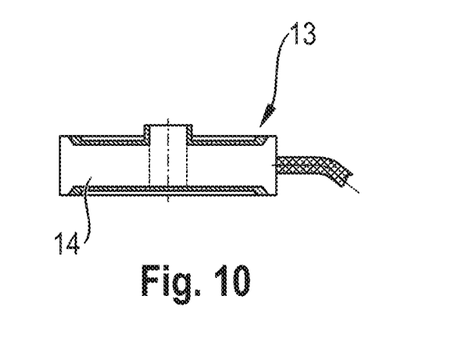
FIG. 10 shows the force-measuring element in a side view.

This force-measuring element 13 measures the current screw force and thus the surface pressure on the battery cell 2. One force-measuring element 13 is thus arranged in each case between at least one plate—for example the second plate 4—and each pressing device 9. The force-measuring element 13—for example a strain gauge sensor—is designed, for example, as a force measuring ring 14, which is penetrated by a bolt- or sleeve-shaped section of the pressing device 9. Accurate force measurement can be achieved if at each corner 3a, 3b, 3c, 3d; 4a, 4b, 4c, 4d of at least one plate 3, 4, a respective force-measuring element 13 is arranged between the plate 3, 4 and a pressing device 9. FIG. 9 and FIG. 10 show an example of a force-measuring element 13.

As an extension, at least one spring—not shown further—can be integrated in each screw connection 10 between the first plate 3 and the second plate 4. This serves to simulate a "floating" mounting of the battery cell 2 in the battery assembly and allows a relative movement of the pressure body to the base platform, i.e. the second plate 4 with respect to the first plate 3.

Alternatively—or in addition—to the springs, at least one cell compression pad, formed for example by an elastomer mat, can be placed between the battery cell 2 and the second plate 4 (not shown in FIGS.).

Both the springs and the cell compression pad can be defined in terms of their stiffness to suit the application and thus represent a real match for the installation situation in the battery pack.

The stiffness of the device 1 can be variably adjusted by means of springs of different stiffness, so that constant forces can be realized over the entire expansion range from 300 N up to 10 kN.

In addition, it is possible, for example, to screw stiffening elements formed by profiles to the side edges of the first plate 3 and/or second plate 4, which allow further variable stiffening. For example, the stiffness of the pressure body formed by the second plate 4 can be increased in discrete steps by attaching lateral profiles of different heights, which are not shown further. In the stiffest variant, up to 40 kN reaction force is thus possible, for example.

Figure 1:
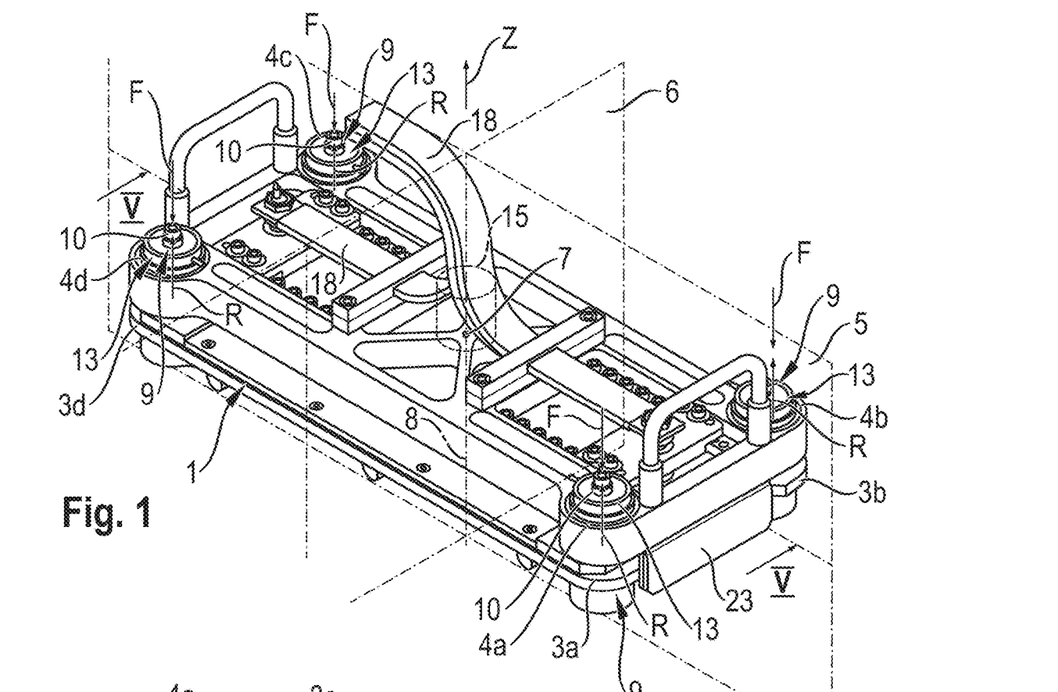
FIG. 1 shows an axonometric representation of a device according to the invention.
Figure 2:
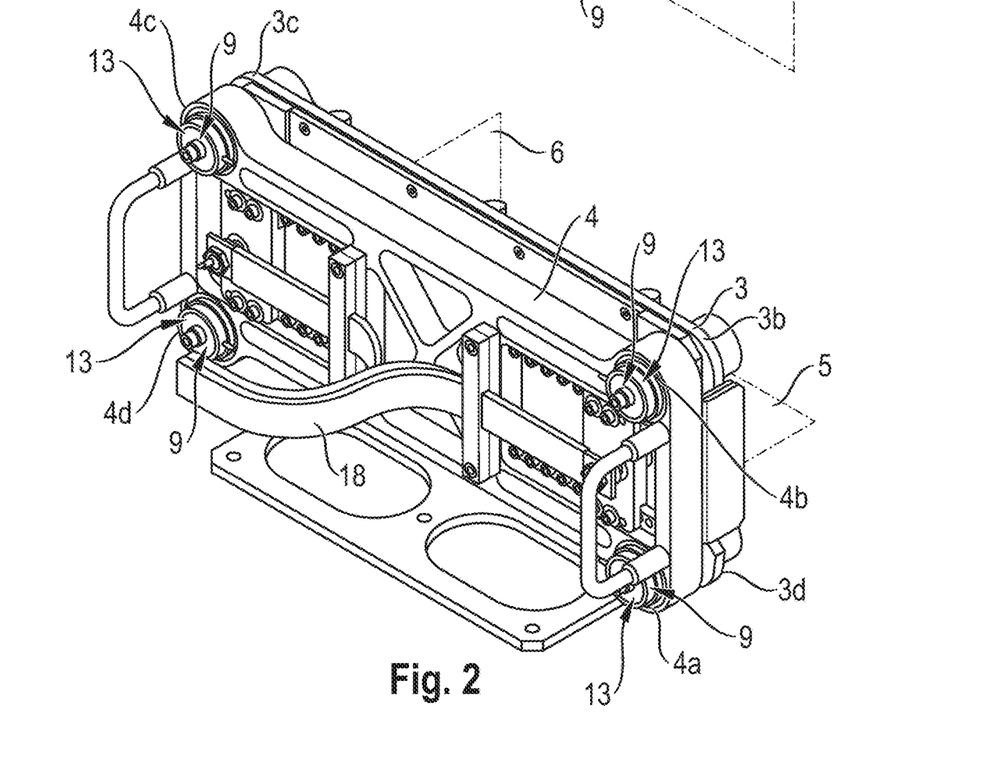
FIG. 2 shows the device in a further axonometric representation.
Figure 3:
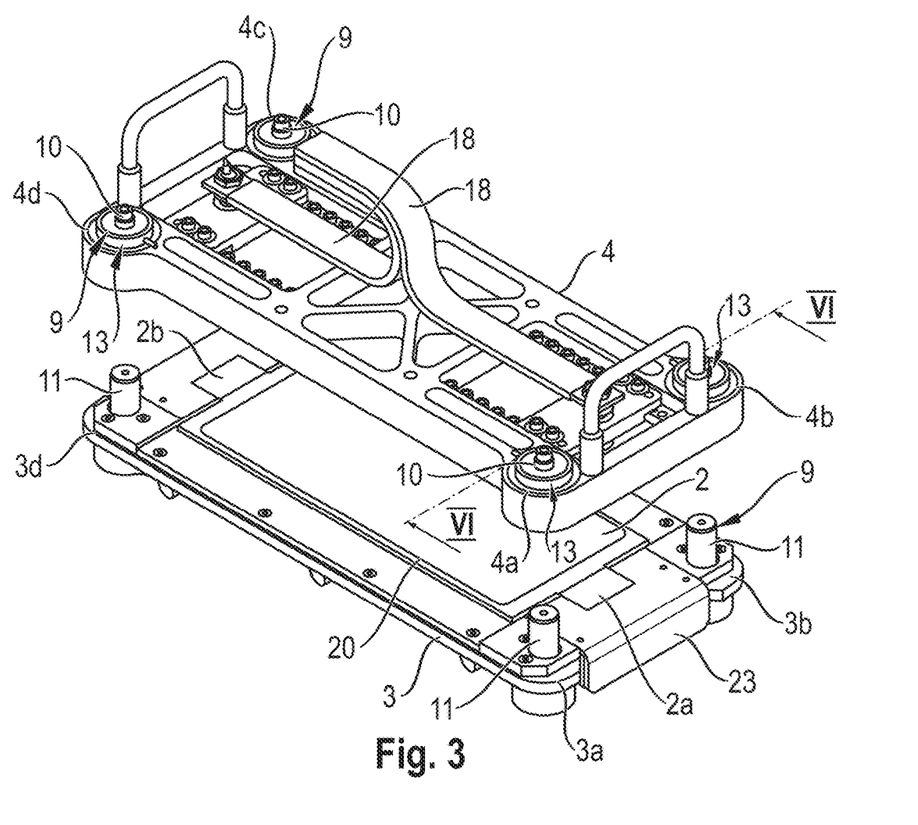
FIG. 3 shows the device in an exploded view.
Figure 4:
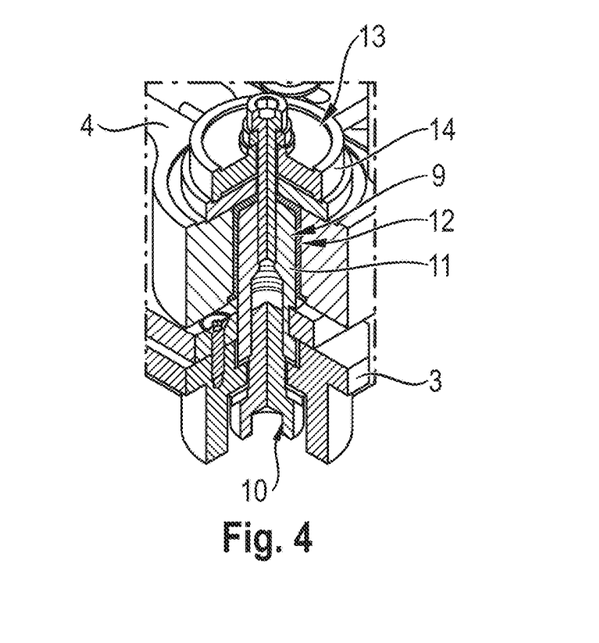
FIG. 4 shows a pressing device of the device in a sectional axonometric view.
Figure 5:
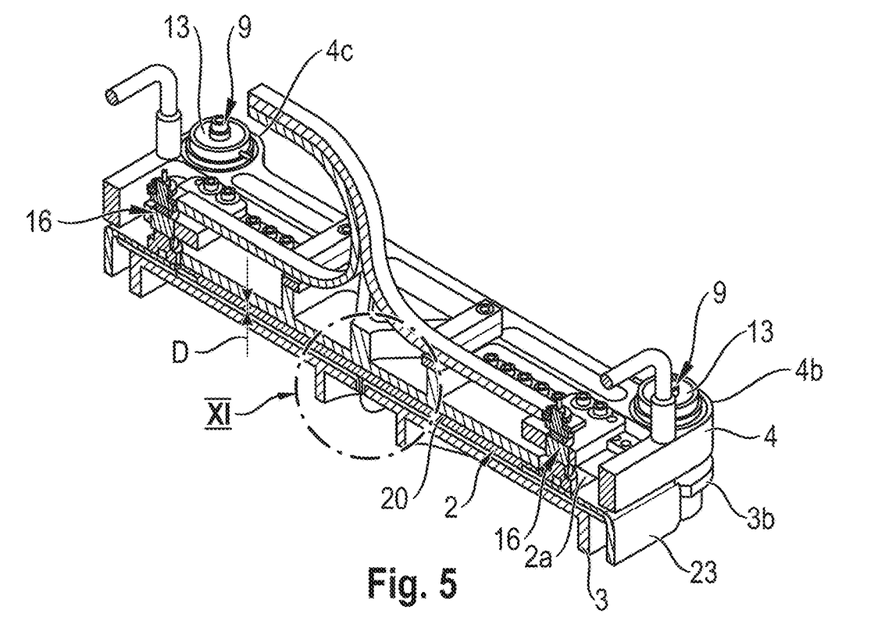
FIG. 5 shows the device in section according to line V-V in FIG. 1.

Furthermore, the device 1 has at least one displacement-measuring element 15 with which the change in thickness D (FIG. 5) of the battery cell 2 can be measured (FIG. 1). The change in thickness is measured in the direction of the vertical axis z drawn in FIG. 1, i.e. in the direction of the smallest extension of the cell body 20 in the exemplary embodiment. The displacement-measuring element 15 can be designed, for example, as an inductive displacement sensor, which is arranged in the region of the intersection line 8 between the longitudinal center plane 5 and the transverse center plane 6.

The displacement-measuring element 15 is formed by a separate component and locally separated from the force-measuring elements 13. The displacement-measuring element 15 can be attached directly to the device 1. The displacement-measuring element 15 is used to measure the change in volume (breathing) of the cell body 20 during charging or discharging of different states of charge and at different temperatures. The displacement-measuring element 15 is used to measure the breathing of the battery cell 2 at different temperatures during charging or discharging. The swelling of the cell body 20 due to aging of the battery cell 2 can also be measured with the displacement-measuring element 15.

Due to the different positions of the force-measuring elements 13 and the displacement-measuring element 15, force and displacement measurements can be carried out simultaneously and thus an exact cell expansion profile of the battery cell 2 under investigation can be created.

In the area of the cell poles 2a, 2b of the battery cell 2, contact elements 16 are arranged in the second plate 4, each with electrical contact pins 17 pretensioned by a compression spring 17a, which establish an electrical contact between the cell poles 2a, 2b and a flexible power cable 18. A temperature sensor 19 is integrated in at least one of the contact elements 16. For accurate temperature monitoring, it is particularly convenient if one temperature sensor 19 is provided for each electrical contact element 16. The electrical voltage can also be measured via the contact element 16, for example to enable compensation for line losses.

Due to the fixed integration of the contact elements 16 in the second plate 4, a quick change and renewed rapid contacting is possible.

Figure 6:
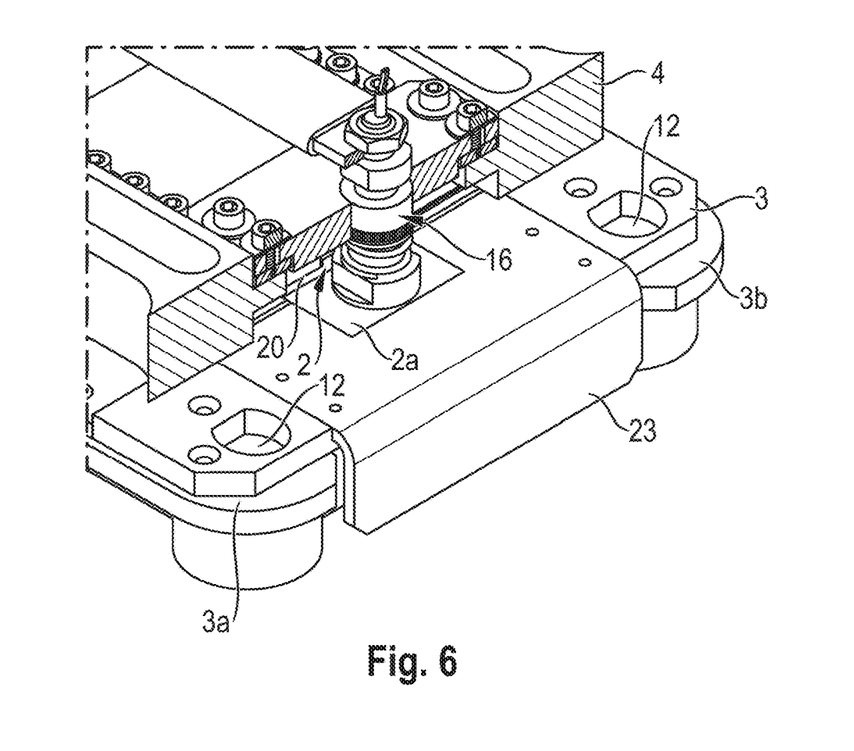
FIG. 6 shows the device in a section through the second plate according to line VI-VI in FIG. 3.
Figure 7:
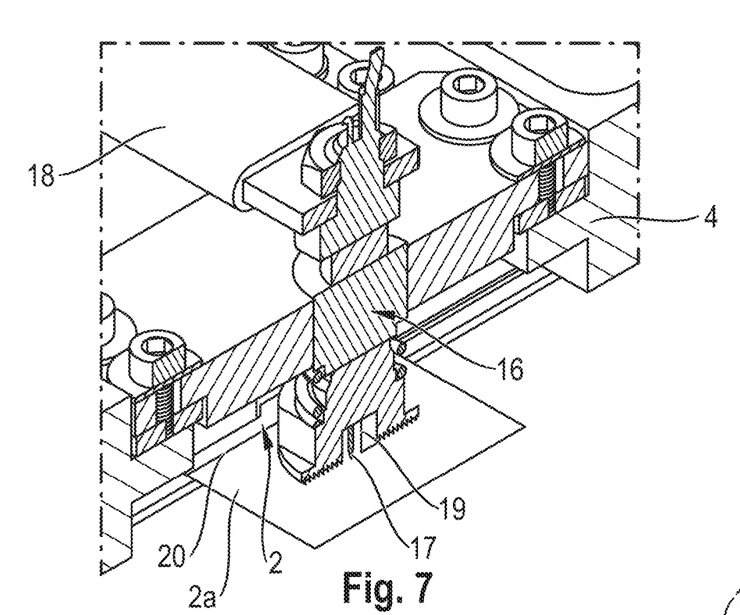
FIG. 7 shows a detailed section of the device from FIG. 6.
Figure 8:
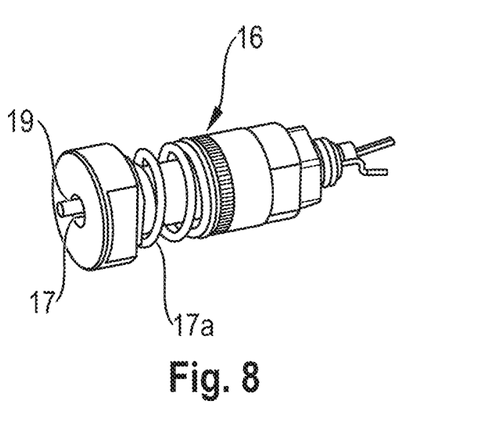
FIG. 8 shows a contact element of the device in an axonometric representation.

A heat dissipation plate 23 may be provided for heat dissipation and cell pole cooling (FIG. 6).

Figure 11:
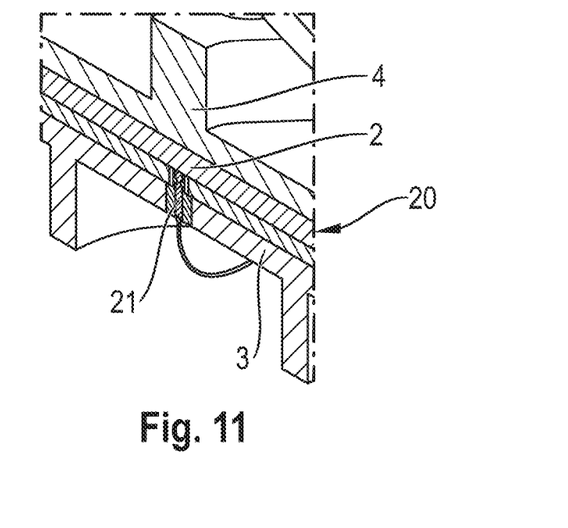
FIG. 11 shows detail XI from FIG. 5.

Furthermore, a spring-loaded thermal measuring element 21 is arranged in the first plate 3, which is pressed against the battery cell 2 from below in a central area, as shown in FIG. 11. The cell body temperature of the battery cell 2 can be measured via the thermal measuring element 21.

All measurements (current, voltage, compressive forces, relative motion) can be recorded and directly compared during operation. The stiffness of the springs or the cell compression pads must be selected as required.

The device 1 is suitable for test environments in temperature chambers with temperatures, for example, between about $-30°$ C.-$+70°$ C.

The compact size of the device 1 allows or facilitates the testing of several test specimens in temperature chambers. For reliable results, experience shows that at least twelve different test configurations with at least three repetitions each are necessary. Thus, both monetary and economic advantages can be achieved.

If few test resources (temperature chambers/climate chambers) are available and, for example, each battery cell 2 must be tested successively, the compact design offers a significant time advantage for obtaining the desired test results.

By measuring force and strain simultaneously, it is possible to determine the stiffness of the test environment as well as the stiffness of the battery cell 2 at any point during cycling/aging. Since the cell stiffness changes during the course of electrical cycling, this is an essential parameter in the mechanical design of the composite of multiple battery cells 2 to form a module. This aspect has not been considered in conventional known devices and resulted in insufficient data.

The size of the present device 1 is particularly compact, so that it is possible to accommodate several devices 1 within a commercially available cell test chamber. This means that the influence of different ambient temperatures can also be taken into account. In addition, this makes it possible to test many battery cells in parallel, which is necessary to adequately characterize the cell swelling and/or cell breathing behavior.

The device 1 is conveniently supplemented by a virtual calculation model with which a model calculation can be carried out to accompany or supplement the hardware tests. With the virtual calculation model of the device 1, it is possible to obtain the pure cell properties of the battery cell 2 and to filter out all interfering influences of the measurement apparatus. This prevents the data generated by device 1 from being distorted by device 1 and the measurement setup itself. This enables—compared to conventional methods—a higher accuracy and better informative value.

The following examinations can be carried out with the device 1:

1. Simulation of the surface pressure on the cell body of the battery cell 2, for example up to 40 kN or above. This makes it possible to investigate at which pretension pressure the battery cell achieves the highest performance. For this purpose, a real-time surface pressure measurement is performed using the four force-measuring elements 13. Furthermore, reproducible surface pressures are determined by the force-measuring elements 13 for each test and each battery cell 2. Finally, a temperature measurement is also carried out on the cell body 20 of the battery cell 2 on the one hand and on the contact elements 16 on the other.
2. Simulation of different stiffnesses to compensate for the cell expansion (breathing, swelling) of the battery cell 2. This makes it possible to investigate how the battery composite must be designed with regard to the expansion of the battery cells. This can be carried out, for example, by integrating cell compression pads and/or springs between plate 3, 4 and battery cell 2.
3. Determining the battery cell expansion at different battery states of charge and temperatures. This makes it possible to investigate how the geometry (thickness) of the battery cell 2 changes at different states of charge and different temperatures. This is carried out by additional displacement measurement by means of at least one displacement-measuring element 15.

The present device 1 is specifically designed to fully characterize cell breathing and/or cell swelling (cell thickness growth due to electro-chemical conversion processes during electrical cycling) of battery cells 2 (pouch cells and prismatic cell types). With the data thus generated, it is then possible to perform a detailed mechanical design of a cell composite (e.g. a battery module).

For this purpose, the virtual calculation model of the device 1 is provided. By combining the device 1 with the virtual calculation model, the true cell properties (adjusted for the influence of the measurement apparatus) can finally be determined with the aid of inverse parameter identification, and a simulation model for the breathing behavior and/or swelling behavior of the battery cell 2 tested in each case can be created.

To fully characterize the breathing behavior and/or swelling behavior of a battery cell 2, the following dependencies must be tested:

Change in thickness D of battery cell 2 over electrical cycle number (as a function of environmental stiffness): The change in thickness D of the battery cell 2 is measured by a displacement-measuring element 15 in the center of the cell body 20. This displacement-measuring element 15 basically measures the relative displacement between the two plates 3, 4. The measured displacement value (together with the measured force value) is then further processed using the virtual calculation model to obtain the pure change in thickness D of the battery cell 2, as well as the associated cell stiffness, expansion profile and pressure dependence.

Force increase due to change in thickness D of battery cell 2 over electrical cycle number (as a function of environmental stiffness): In order to measure the force increase due to the change in thickness of the battery cell 2, four force-measuring elements 15 formed by force measuring rings 14 are installed at the outer corners 3a, 3b, 3c, 3d; 4a, 4b, 4c, 4d of the plates 3, 4. Due to the positioning of the force-measuring elements 15, it is not only possible to measure the average force increase, but also local differences. The measured force value (together with the measured displacement value) is then further processed using the virtual calculation model to obtain the pure change in thickness D of the battery cell 2 and the associated cell stiffness, expansion profile and pressure dependence.

Stiffness change of battery cell 2 via electrical cycle number: If the force increase and the change in thickness D are only measured during cyclization, no information is obtained about the cell stiffness, but only a statement about the stiffness of device 1. This means that there are many pairs of cell stiffness and pure change in thickness D of battery cell 2, which in combination provide the same measurement result. For this reason, at specified numbers of cycles, the electrical cycling must be interrupted and the cell stiffness must be measured. It is important that the battery cell 2, for example, does not have to be removed and installed in another measuring device, as this could falsify the result. The present device 1 is designed precisely for this purpose and therefore offers the possibility of simultaneous force and displacement measurement. Furthermore, by positioning the force-measuring elements 15 at the screw connections 10 at any time, the cell stiffness can be measured in a force-controlled manner by synchronously loosening or/tightening all screw connections 10. In other words, multi-step loosening or tightening of the screw connections 10 is performed with electrical cycling stopped, without the need to remove the battery cell 2. This gives force/displacement curves, which are then further refined using the virtual computational model to extract the pure cell stiffness. In the process, the influence of the apparatus stiffness is filtered out. If now the cell stiffness related to the number of cycles is known, there is only one value of cell thickness growth with which the measured force increase can be achieved. Only through this combination is it possible to determine the actual cell properties from the test.

Expansion profile of battery cell 2: The change in thickness D of battery cell 2 does not occur uniformly over the entire surface. Instead, one usually notices a larger change in thickness D in the center of the cell compared to the cell periphery. This influence is decisive for the integration of a battery cell 2 into a cell network. In order to measure this effect, in the present device 1 the force-measuring elements 13 are attached to the four corners 3a, 3b, 3c, 3d; 4a, 4b, 4c, 4d of the plates 3, 4 at the edge of the battery cell 2 and the displacement-measuring element 15 for measuring the cell expansion is attached to the center of the battery cell 2. Now, if there is a large increase in force but a small change in displacement, the thickness growth is pronounced at the edge of the battery cell 2. If there is a large change in displacement and only a small change in force, the thickness growth is pronounced in the center of the battery cell 2. In this way, not only the average cell thickness growth can be characterized, but also the expansion profile. In addition to the appropriate positioning of the force-measuring elements 13 and the displacement-measuring element 15, the simultaneous measurement of force and displacement is necessary for this.

Pressure dependence of the change in thickness D of the battery cell 2 over electrical cycling: The expansion of the battery cell 2 is usually dependent on the mechanical pressure acting on the cell surface during electrical cycling. In order to characterize this effect, the present device 1 is designed to be very flexible with respect to the adjustable pretensions and also stiffnesses. For example, the pretension range is from about 100 N up to about 40 kN.

To fully characterize the pressure dependence, it is not sufficient to control only the initial stress. In addition, it is also necessary to control the force/pressure variation during cycling due to the thickness growth of the battery cell 2. For this purpose, the present device 1 provides the possibility to make the stiffness of the cell clamping variable by means of springs with different stiffnesses. In this way, it is possible to achieve a constant clamping situation over the entire electrical cyclization. By using springs with different spring stiffness, different pressure levels can be kept constant. In this way, cell thickness growth is obtained for the respective pressure levels. Furthermore, in order to further characterize the influence of a varying pressure during cycling, the battery cell 2 in the device 1 can also be rigidly clamped by means of the screw connection 10. In this case, the force/pressure increase depends on the stiffness of the plates 3, 4. Again, the possibility is provided to vary the stiffnesses of the plates 3, 4 by additionally mounting side profiles in two steps. This provides sufficient variation options to reproduce all possible bracing situations in a cell composite with the device 1.

Figure 12:
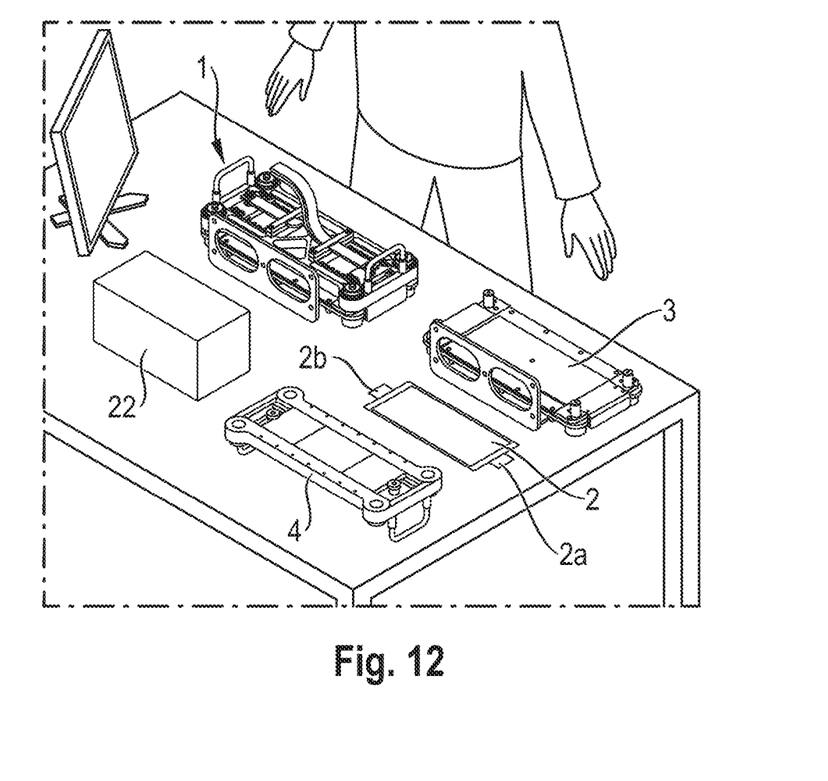
FIG. 12 shows a test stand for the application of the device.

FIG. 12 shows a test stand with two devices 1 for testing several battery cells 2 which are in different application states. The right-hand device 1 shown in the foreground is not yet assembled and the left-hand device 1 is already fully assembled.

The preparation of the device 1 is carried out in the following steps:
- Inserting the battery cell 2 into the base platform formed by the first plate 3;
- Optionally placing a cell compression pad on the battery cell 2;
- Placing the second plate 4 on the battery cell 2 or on the cell compression pad;
- Attachment of the screw connection 10 with the force-measuring elements 13;
- Connecting the force-measuring elements 13 to a measuring unit 22;
- Crosswise tightening of the screw connections 10 in several steps, wherein the cell poles 2a, 2b are automatically contacted by the contact elements 16;
- Monitoring the symmetrical force increase at each screw connection 10.

The invention claimed is:

1. A device for testing at least one battery cell, comprising:
   a first plate, and
   a second plate, wherein the battery cell is clamped between the two plates, which are substantially rectangular, and at least one plate is pressed against the battery cell with a defined mechanical pressing force, having at least one force-measuring element arranged between one plate and at least one pressing device for measuring a reaction force between the battery cell and the pressing device, wherein at least one change in a thickness of the battery cell can be measured, by means of at least one displacement-measuring element, and wherein at least one change in the thickness of the battery cell can be measured simultaneously with the reaction force.

2. The device according to claim 1, wherein the at least one force-measuring element and the at least one displacement-measuring element are formed by separate components.

3. The device according to claim 1, wherein the at least one displacement-measuring element is arranged in the region of a plane selected from the group consisting of a longitudinal center plane and a transverse center plane of a component selected from the group consisting of the battery cell and at least one plate.

4. The device according to claim 1, wherein the displacement-measuring element is arranged in the region of an intersection line between a longitudinal center plane and a transverse center plane of at least on of the battery cell and at least one plate.

5. The device according to claim 1, wherein in the region of at least two corners of at least one plate, a force-measuring element is arranged between the plate and a pressing device.

6. The device according to claim 1, wherein at least one force-measuring element is designed as a strain gauge sensor.

7. The device according to claim 1, wherein the displacement-measuring element is designed as an inductive displacement sensor.

8. The device according to claim 1 wherein at least one plate, has at least one thermal measuring element for measuring the cell body temperature of the battery cell.

9. The device according to claim 1, wherein a component selected from the group consisting of at least one cell compression pad and at least one spring with defined stiffness is arranged between at least one plate and the battery cell.

10. The device according to claim 1, wherein in the region of at each corner of at least one plate, a force-measuring element is arranged in each case between the plate and a pressing device.

11. The device according to claim 1, wherein the first plate, has at least one thermal measuring element for measuring the cell body temperature of the battery cell.

12. The device according to claim 1, wherein the first plate and the second plate are connected to one another by at least one pressing device.

13. The device according to claim 12, wherein the pressing device is arranged in the region of a corner of the first plate and the second plate.

14. The device according to claim 1, wherein at least one force-measuring element is designed as a force measuring ring.

15. The device according to claim 14, wherein the force measuring ring is penetrated by a bolt-shaped section or sleeve-shaped section of the pressing device.

16. The device according to claim 1, wherein at least one plate has at least one contact element which establishes an electrical connection between at least one cell pole and a power cable.

17. The device according to claim 16, wherein a sensor selected from the group consisting of a temperature sensor and a voltage sensor is integrated in at least one contact element.

18. The device according to claim 16, wherein the second plate has said at least one contact element.

19. A method for testing at least one battery cell, comprising a device according to claim 1, wherein the battery cell is clamped between a first plate and a second plate and at least one plate is pressed against the battery cell with a defined mechanical pressing force, wherein at least one reaction force between the battery cell and at least one plate is measured, wherein at least one change in the thickness of the battery cell is also measured.

20. The method according to claim 19, wherein at least one reaction force (R) and at least one change in thickness (D) of the battery cell are measured at different locations of the battery cell.

21. The method according to claim 19, wherein at least two reaction forces (R) are measured at different locations of the battery cell.

22. The method according to claim 19, wherein at least one change in the thickness of the battery cell is also measured simultaneously with the reaction force.

23. The method according to claim 19, wherein, based on the measurement results, a model calculation is carried out with at least one of a virtual calculation model of the device and the battery cell, wherein disturbance variables and influencing variables of the device are filtered out.

24. The method according to claim 23, wherein the model calculation is carried out by means of inverse parameter identification.

* * * * *